(No Model.)
2 Sheets—Sheet 2.

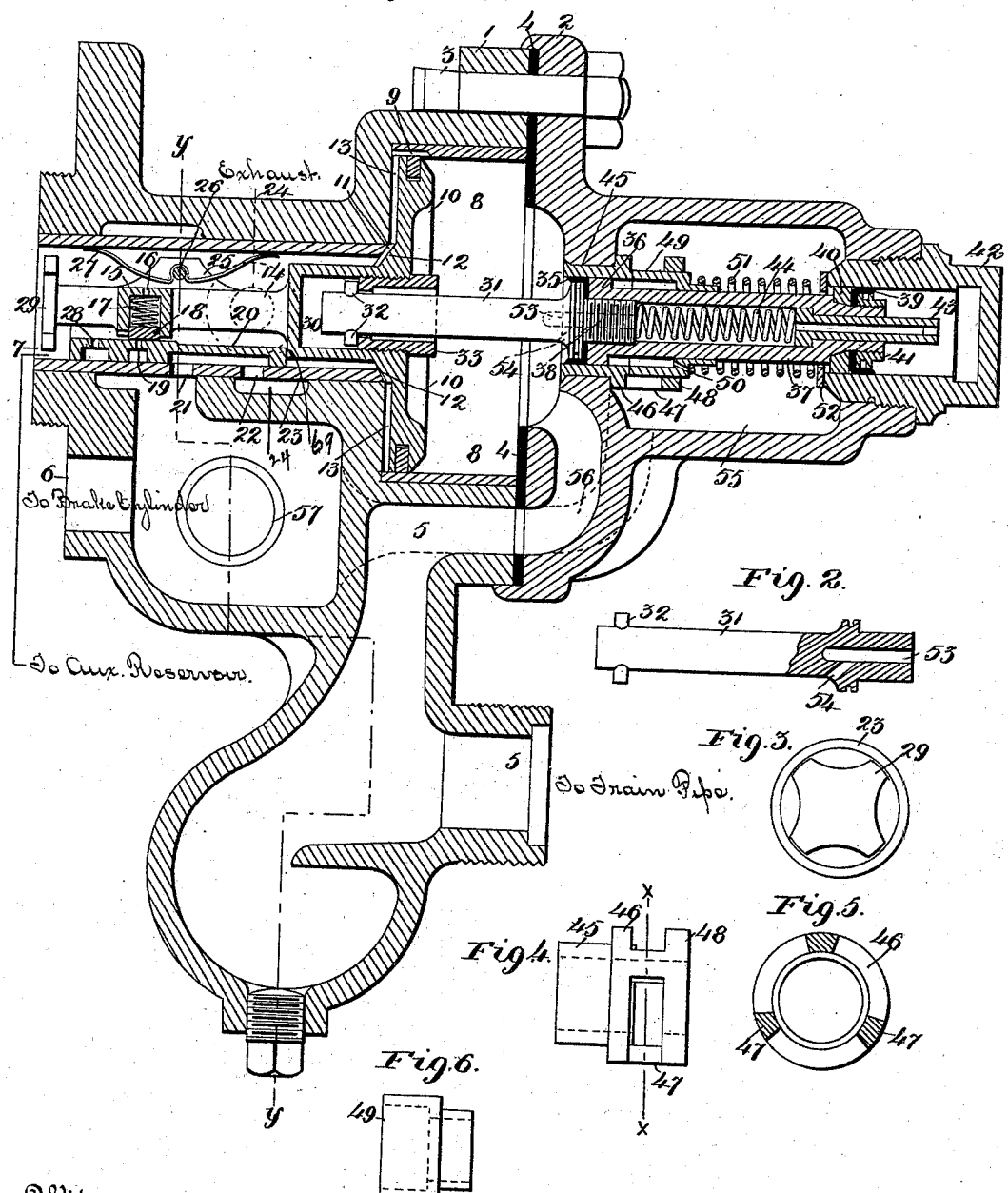

H. GUELS.
AUTOMATIC FLUID PRESSURE BRAKE MECHANISM.

No. 526,187. Patented Sept. 18, 1894.

Witnesses

Inventor
Herman Guels.
By his Attorneys,

# UNITED STATES PATENT OFFICE.

HERMAN GUELS, OF ST. LOUIS, MISSOURI, ASSIGNOR TO THE LANSBERG BRAKE COMPANY, OF SAME PLACE.

AUTOMATIC FLUID-PRESSURE BRAKE MECHANISM.

SPECIFICATION forming part of Letters Patent No. 526,187, dated September 18, 1894.

Application filed April 2, 1894. Serial No. 505,992. (No model.)

*To all whom it may concern:*

Be it known that I, HERMAN GUELS, of the city of St. Louis, State of Missouri, have invented certain new and useful Improvemnets in Automatic Fluid-Pressure Brake Mechanisms, of which the following is a full, clear, and exact description, reference being had to the accompanying drawings, forming a part hereof.

My invention has relation to improvements in automatic fluid pressure brake mechanisms and consists in the novel arrangement and combination of parts more fully set forth in the specification and pointed out in the claims.

Figure 7:
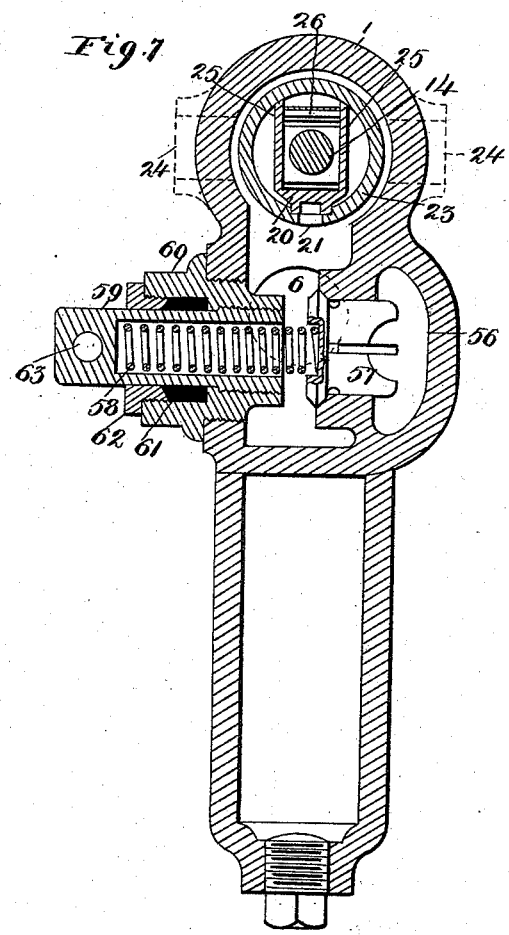
Figure 8:
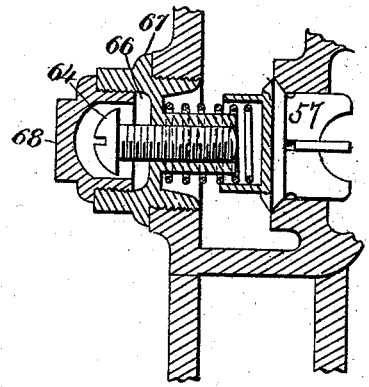

In the drawings, Figure 1 is a vertical longitudinal section of the valve. Fig. 2 is an elevation, partly in section of the perforated emergency stem. Fig. 3 is a top plan view of the terminal cap carried by the piston stem and the bushing within which it operates. Fig. 4 is a plan view of the guide cage for the emergency valve. Fig. 5 is a section on the line *x—x* of Fig. 4. Fig. 6 is a plan view of the cup co-operating with the emergency valve. Fig. 7 is a cross section on the line *y—y* of Fig. 1; and Fig. 8 is a similar section showing a modification of the check valve.

The present invention is an improvement in that class of fluid pressure brake mechanisms wherein air is admitted from an auxiliary reservoir into the brake cylinder to put on brakes for service stops, and wherein air both from the train pipe and said reservoir is admitted for putting on brakes in emergency cases.

It consists of an emergency valve that is thoroughly and completely balanced under all conditions and variations of pressure, and which when disabled for any reason will not affect the operation of that portion of the valve by which the brakes are applied for ordinary service stops.

It also consists in the addition of means for completely shutting off communication between the train pipe and brake cylinder, by retaining the check valve interposed between the train pipe and brake cylinder on its seat during the disability of the emergency portion of the valve.

It further consists of a special construction of valve controlling admission from the auxiliary reservoir to the brake cylinder, and in other details to be hereinafter specifically described.

The mechanism may be described as follows: The device is composed of a sectional casing having sections 1 and 2 held together by bolts 3, suitable packing 4 being interposed between the sections. The section 1 has passages 5, 6, and 7 leading respectively to the train pipe, brake cylinder and the auxiliary reservoir as fully indicated in Fig 1. Between the sections 1 and 2 is the main valve chamber 8 whose inner wall is provided with a feed groove 9 controlled by the main piston 10. The said piston controls communication between the train pipe and auxiliary reservoir, and upon a slight reduction of air pressure within the train pipe, the excess of air pressure from the auxiliary reservoir immediately drives the said piston to the right, closing the feed groove 9. When the piston 10 is in its normal or feeding position, the air passes from the chamber 8, *via* groove 9, and groove 11 formed in the shoulder 12 of the piston, into the passage 7, said shoulder 12 forming, and permitting the air to freely circulate in, the space 13 between the left hand face of the piston and the inner walls of the casing 1. To the left of the piston 10 and either forming a part thereof or secured thereto, extends a piston stem 14 in the path of which and at a suitable point thereof is a cavity 15 having a port 16 leading to the passage 7 and confining a spiral spring 17 at the free end of which is a block valve 18 guided by the walls of said chamber, said block valve being adapted to control the port 19 of a slide valve 20 which latter has its bearing surfaces so disposed as to control the ports 21 and 22 of the bushing 23 within which it operates, the port 21 leading to the brake cylinder, and the port 22 to the exhaust passage 24. The slide valve has preferably the wings or walls 25, between which is a rod 26 against which bears a spring 27 so as to keep the valve against its seat afforded by the bushing 23. The port 28 of the slide valve controls the admission of air from the passage 7 through the port 21 to the brake cylinder in emergency cases as will be subsequently explained, the slide valve being carried to the right to bring these ports into alignment by the cap piece 29 secured to the free end of the stem 14, as the latter is forced to the right by pressure of air on the left of the piston 10. The stem 14 is provided with a cavity 30, the piston 10 having an opening of corresponding diameter. Into this cavity is inserted one end of the emergency stem 31, the stem being retained therein by a transverse pin 32 coming in contact with the inner edge of a nut 33 passed around the stem and screwed into the opening of the piston as fully indicated in Fig. 1. The stem is adapted to move freely in said nut. The depth of the cavity 30 is such as to allow the piston and the parts secured thereto a motion independent of and in advance of the emergency stem 31. The latter has a bucket or valve 35 serving as the emergency valve which is formed by interposing suitable packing between the expanded right hand end of the stem and the flange 36 of the sleeve 37 secured to the screw-threaded projection 38 of said stem. The right hand end of the sleeve 37 carries a bucket or valve 39 of the same area as the valve 35 and formed by interposing suitable packing between a disk 40 and nut 41 screwed on the free end of the sleeve, which bucket operates within the cap piece 42. The right hand end of the sleeve carries the movable graduating stem 43 controlled by a spring 44 within the sleeve, the free end of said stem being adapted to strike the inner wall of the cap piece 42 when the air is admitted from the auxiliary reservoir to the brake cylinder.

The emergency valve operates within the bushing 45 from a flange 46 of which project the guide fingers 47 terminating in a rim 48, the whole forming a guide cage for the valve. This cage guides the movement of the cup 49 (having ports 50 to prevent the air from being imprisoned therein and compressed by the emergency valve 35). The cup is held in its normal position by a spiral spring 51 coiled around the sleeve 37 and resting at its other end against an annular disk 52 abutting against the cap piece 42 and loosely embracing the sleeve.

The stem 31 is perforated by passages 53 and 54 effecting communication between the chamber 8 (and consequently the train pipe), and the interior of the sleeve 37; and the graduating stem 43 is hollow so that the air can freely circulate from the chamber 8 through the stem, sleeve, and graduating stem to the chamber formed within the cap piece 42, and thus the air pressure is transmitted to the right of the valve 39 which has the same area as the valve 35. By this construction the emergency stem and valve become thoroughly balanced, the valves carried by the stem being subjected at all times to equal pressure of air from opposite sides and the available pressure that drives the piston 10 upon a reduction of air in the train pipe, will be the actual excess of air pressure which for the time will be on the left side of the said piston; and if the emergency stem and valve and the parts secured thereto were actually disabled, still, these parts being thoroughly balanced, they can in no way offer resistance to any movement that might be imparted to the piston 10 in applying brakes in service stops; so that if with the present valve the emergency portion were totally disabled, the mechanism would still be serviceable in applying brakes for ordinary service stops provided the check valve establishing communication between the train pipe and brake cylinder is secured to its seat, as will hereinafter be more fully explained.

In case of disability of the emergency portion, and possible leakage of air from the train pipe into the brake cylinder via chamber 55 and passage 56, which would have a tendency to unseat the check valve 57 usually interposed between the said passage 56 and the brake cylinder, it is desirable that under such circumstances the check valve should remain permanently seated to enable the brakes to be applied for ordinary service stops. It is apparent that the check valve must remain seated, since the air passing by it from the train pipe into the brake cylinder, would leak into the atmosphere, the exhaust from the brake cylinder being open, since all the parts would be in their normal position while the train is running and the brakes are off; and consequently the proper conditions would not exist in the train pipe at the moment it was desirable to apply the brakes in service stops. This I accomplish by confining the spring 58 which retains the valve on its seat under ordinary circumstances, in the cavity of a plug 59 adapted to be screwed in the casing to and from the valve. In the form shown in Fig. 7, the plug 59 screws into the cylindrical nut 60, suitable packing 61 being interposed between the plug and inner walls of the nut, the whole covered by a cap 62. An opening 63 is left in the free end of the plug for the insertion of a suitable lever when it is desired to screw the inner end of the plug against the check valve 57 and prevent the same from unseating under the circumstances above referred to. In Fig. 8 I have shown a modification where the bolt 64 is adapted to secure the check valve 57 against its seat, the bolt being protected and thus prevented from being turned by unauthorized persons or by accident by confining its head in the depression 66 of the nut 67, and protecting said bolt by a cap 68. The latter is simply unscrewed when it is desired to operate the bolt. The cap prevents also the parts from leaking even without packing.

The operation of the valve can be described with reference to three conditions: In the first place let us assume that the auxiliary reservoir is empty. Air is admitted from the main reservoir (not shown) into the train pipe and travels through passage 5 into the main valve chamber 8 forcing the main piston 10 to feeding position, that is, the position shown in Fig. 1, thus bringing its seat or shoulder 12 against the bushing 23 and establishing communication *via* passage 5, chamber 8, groove 9, air space 13, groove 11, and passage 7 between the train pipe and the auxiliary reservoir. At the same time the position of the remaining parts will be as indicated in Fig. 1, that is, the brake cylinder communicating through port 21, port 22, exhaust port 24 with the atmosphere. The emergency valve 35 too closes communication between chamber 8 and chamber 55 communicating with passage 56 leading to the brake cylinder.

The second condition contemplates a gradual reduction of air pressure within the train pipe for the application of brakes in service stops. The train pipe pressure is gradually reduced (say eight pounds) on the right of the main piston 10. The excess of pressure on the left thereof from the auxiliary reservoir immediately drives the main piston 10 to the right closing feed groove 9 and causing the block valve 18 carried by the stem 14 to uncover the port 19 of the slide valve. There being little weight and friction to overcome (the piston with its stem having an independent movement in advance of the emergency stem) the said piston is responsive to the slightest variation of air pressure within the train pipe. The piston 10 will thus move to the right until the bottom of the cavity 30 strikes the left end of the emergency stem 31 and the cap piece 29 comes in contact with the left end of the slide valve when the latter will be carried to the right until the port 19 comes opposite the port 21, thus admitting air from the auxiliary reservoir to the brake cylinder, and applying the brakes gradually, and at the same time the slide valve will shut off communication between the brake cylinder and port 22 leading to the exhaust. While this is occurring, the emergency valve 35 and sleeve 37 connected thereto have caused the movable stem 43 to come in contact with the cap 42 and the spring 44 prevents the parts from moving farther to the right, and thus graduates the movement of the parts. As soon as the engineer allows the pressure within the train pipe to resume its normal condition, the main piston and all the parts connected thereto are forced to their original positions as shown in Fig. 1, the slide valve 20, it being understood, being pushed back by the shoulder 69 of the enlarged end of the stem 14.

The third and last condition contemplates a sudden reduction of air pressure within the train pipe for application of brakes in emergency cases. A reduction of ten pounds or more, quickly, will suddenly drive the main piston 10 and stem forming part thereof to the right, causing the emergency valve 35 to pass into the cup 49 compressing the spring 51 of said cup as well as causing compression of spring 44 driving said cup from its seat on the bushing 45 and allowing train pipe air to communicate with the brake cylinder *via* chamber 8, bushing 45, the cage projecting therefrom, chamber 55, passage 56 and check valve 57 which is unseated at that instant. While this is taking place the port 28 of the slide valve 20 comes opposite port 21 of the bushing 23 admitting in addition air from the auxiliary reservoir into the brake cylinder, but on the opposite side of the check valve, the port 19 of said valve coming between the ports 21 and 22 of the bushing and the bearing surface on the right of the port 19 closing the port 22 to the atmosphere, thus preventing the brake cylinder from exhausting. When the pressure in the train pipe is allowed to resume its normal condition, the main piston is driven to the left, the parts are restored to their normal positions and the brake cylinder once more communicates with the atmosphere. In case of disability of the emergency portion of the valve, the check valve is screwed to its seat as above described, and the mechanism is only used to put on brakes as under ordinary service stop conditions, and thus the particular car on which the disability occurs need not be detached from the rest of the train nor its brake mechanism shut off, but its brakes may still be operated.

Although the emergency stem and parts secured thereto are absolutely balanced under all circumstances, I have deemed it desirable and important to connect said stem to the main piston, giving the latter however a movement independent of and in advance of the stem, so that if for any reason the springs attached to the said stem should cease or fail to respond and thus restore the parts to their normal positions, the piston being connected to the stem will always assist said stem in assuming its normal position. At the same time the friction of the emergency valve is utilized to prevent the knocking off of the front brakes by the ordinary return flow of air in the train pipe after the first reduction thereof in said pipe.

Having described my invention, what I claim is—

1. In an automatic fluid-pressure brake mechanism, a main valve chamber, a piston in said chamber controlling communication between the auxiliary reservoir and train pipe, and a perforated emergency stem adapted to co-operate with said piston, the passage in the stem being in constant open communication with the train pipe substantially as set forth.

2. In an automatic fluid-pressure brake mechanism, a main valve chamber, a piston movable in said chamber and adapted to control communication between the train pipe and the auxiliary reservoir, a stem secured to said piston adapted to control communication between the auxiliary reservoir and brake cylinder, and an emergency stem having a valve controlling communication between the train pipe and brake cylinder, connected to said piston the latter having a movement independent of and in advance of said emergency stem, substantially as set forth.

3. In an automatic fluid-pressure brake mechanism, a main valve chamber, a piston movable in said chamber and adapted to control communication between the train pipe and the auxiliary reservoir, a stem secured to said piston adapted to control communication between the auxiliary reservoir and brake cylinder, and a perforated emergency stem whose passage is in constant open communication with the main valve chamber and train pipe having a valve controlling communication between the train pipe and brake cylinder, connected to said piston the latter having a movement in advance of said emergency stem, substantially as set forth.

4. In an automatic fluid-pressure brake mechanism, a main valve chamber, a piston in said chamber controlling communication between the auxiliary reservoir and train pipe, a perforated emergency stem adapted to co-operate with said piston, a sleeve secured to said stem, and a hollow spring controlled graduating stem in said sleeve communicating with said perforated emergency stem, and establishing constant open communication with the main valve chamber and the train pipe substantially as set forth.

5. In an automatic fluid-pressure brake mechanism, a perforated emergency stem, an emergency valve on said stem, and a second valve of equal area to the emergency valve adapted to be controlled by said stem, substantially as set forth.

6. In an automatic fluid-pressure brake mechanism, a perforated emergency stem having a passage in constant open communication with the train pipe, and an emergency valve carried by said stem, the said valve being subjected to equal and constant air pressure on opposite sides, substantially as set forth.

7. In an automatic fluid pressure brake mechanism, a casing having passages leading respectively to an auxiliary reservoir, a brake cylinder and train pipe, a passage adapted to convey air from the train pipe to the brake cylinder, a check valve interposed in the path of said passage to the brake cylinder, and means for securing said check valve to its seat against the pressure of air passing from the train pipe to said brake cylinder, substantially as set forth.

8. In an automatic fluid-pressure brake mechanism, a casing having passages leading respectively to an auxiliary reservoir, a brake cylinder and train pipe, a passage adapted to convey air from the train pipe to the brake cylinder, a check valve interposed in the path of said passage to the brake cylinder, and a suitable plug adapted to be screwed or otherwise held against the check valve to secure the latter to its seat against air pressure tending to unseat said valve, substantially as set forth.

9. In an automatic fluid-pressure brake mechanism having a main valve chamber, the combination with an emergency stem having an emergency valve, of a sleeve secured to said stem, a second valve of equal area with the emergency valve carried by said sleeve, a cap piece secured to the casing of the mechanism, the said stem being perforated to establish communication between said valve chamber and the chamber formed by the cap piece and within which said second valve operates, substantially as set forth.

10. In an automatic fluid-pressure brake mechanism, a suitable perforated emergency stem having a passage in constant open communication with the train pipe, a sleeve carried by said stem, a hollow movable graduating stem carried by said sleeve, and a spring controlling the movement of said stem, the train pipe air being free to pass through the stem, sleeve and graduating stem, substantially as set forth.

11. In an automatic fluid-pressure brake mechanism, a spring actuated check valve, a screw-threaded plug having a cavity for the reception of one end of the spring actuating the valve, a nut within which said plug is secured, said plug being adapted to be screwed within said nut and its free end come in contact with the under side of said valve to prevent the latter from unseating against air pressure in case of accident to the brake mechanism, substantially as set forth.

In testimony whereof I affix my signature in the presence of two witnesses.

HERMAN GUELS.

Witnesses:
FRANK LANSBERG,
JAMES J. O'DONOHOE.